(12) United States Patent
Kurita

(10) Patent No.: US 8,111,643 B2
(45) Date of Patent: Feb. 7, 2012

(54) COMMUNICATION CONTROL METHOD OF WIRELESS LAN SYSTEM AND RELAY APPARATUS

(75) Inventor: Shigeru Kurita, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 778 days.

(21) Appl. No.: 11/559,030

(22) Filed: Nov. 13, 2006

(65) Prior Publication Data

US 2007/0217351 A1    Sep. 20, 2007

(30) Foreign Application Priority Data

Nov. 11, 2005   (JP) ................. 2005-327722

(51) Int. Cl.
*G01R 31/08* (2006.01)
*H04W 4/00* (2009.01)
*H04W 72/00* (2009.01)

(52) U.S. Cl. ......... 370/312; 370/235; 370/328; 455/453

(58) Field of Classification Search .............. 370/338, 370/315, 312, 329; 375/149; 455/453, 435.1, 455/450, 9; 709/224
See application file for complete search history.

(56) References Cited

U.S. PATENT DOCUMENTS

| 6,034,951 | A * | 3/2000 | Du ........................ 370/328 |
| 2003/0027607 | A1 * | 2/2003 | Hatakeyama et al. ........ 455/569 |
| 2003/0134642 | A1 * | 7/2003 | Kostic et al. .................. 455/450 |

FOREIGN PATENT DOCUMENTS

| EP | 1 416 686 A1 | 5/2004 |
| JP | 10-41969 A | 2/1998 |
| JP | 11-55286 A | 2/1999 |
| JP | 2000-101596 A | 4/2000 |
| JP | 2002-185458 A | 6/2002 |
| JP | 2003-101551 A | 4/2003 |
| JP | 2003-124939 A | 4/2003 |
| JP | 2004-140614 A | 5/2004 |
| JP | 2004-207839 A | 7/2004 |
| JP | 2004-207840 A | 7/2004 |

(Continued)

OTHER PUBLICATIONS

Distributed Mechanism for Quality of Service in Wireless LANs by Wasan Pattara-atikom, Prashant Krishnamurthy & Sujata Banerjee.*

(Continued)

*Primary Examiner* — George Eng
*Assistant Examiner* — Nizar Sivji
(74) *Attorney, Agent, or Firm* — Sughrue Mion, PLLC

(57) ABSTRACT

A relay apparatus (100) acting as an access point of wireless LAN watches a packet showing a request of starting communication among the packets to be relayed between terminal apparatuses (101,102) and records the identification information of the terminal apparatus included in the packet. When the number of the terminal apparatuses whose identification information is recorded exceeds a preset upper limit value, the relay apparatus disconnects a communication relating to the latest identification information by transmitting a disconnection command or discarding the packet. With this arrangement, deterioration of streaming communication controlled by an access point (AP) of wireless LAN can be prevented.

12 Claims, 12 Drawing Sheets

| FOREIGN PATENT DOCUMENTS | | | |
|---|---|---|---|
| JP | 2004-221684 | A | 8/2004 |
| JP | 2004-289723 | A | 10/2004 |
| JP | 2004-320274 | A | 11/2004 |
| JP | 2005-12724 | A | 1/2005 |
| JP | 2005-12725 | A | 1/2005 |
| JP | 2005-51661 | A | 2/2005 |
| JP | 2005-57728 | A | 3/2005 |
| JP | 2005-080157 | A | 3/2005 |

OTHER PUBLICATIONS

H. Lufei, et al.: "Application-Aware Service Differentiation in PAWNs"; Proceedings of the 2004 International Conference on Parallel Processing (ICPP'04); Aug. 15, 2004; pp. 415-422.

G. Kousalya, et al.: "Dynamic Resource Management Framework for Wireless LAN"; Wireless and Optical Communications Networks (WOCN 2005); Mar. 6, 2005; pp. 561-567.

* cited by examiner

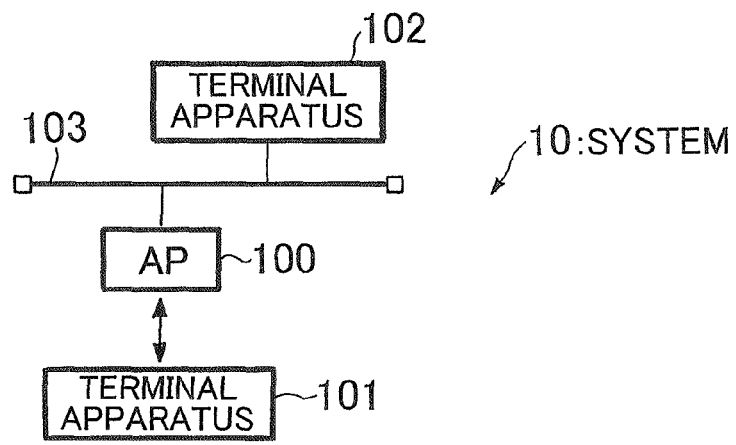
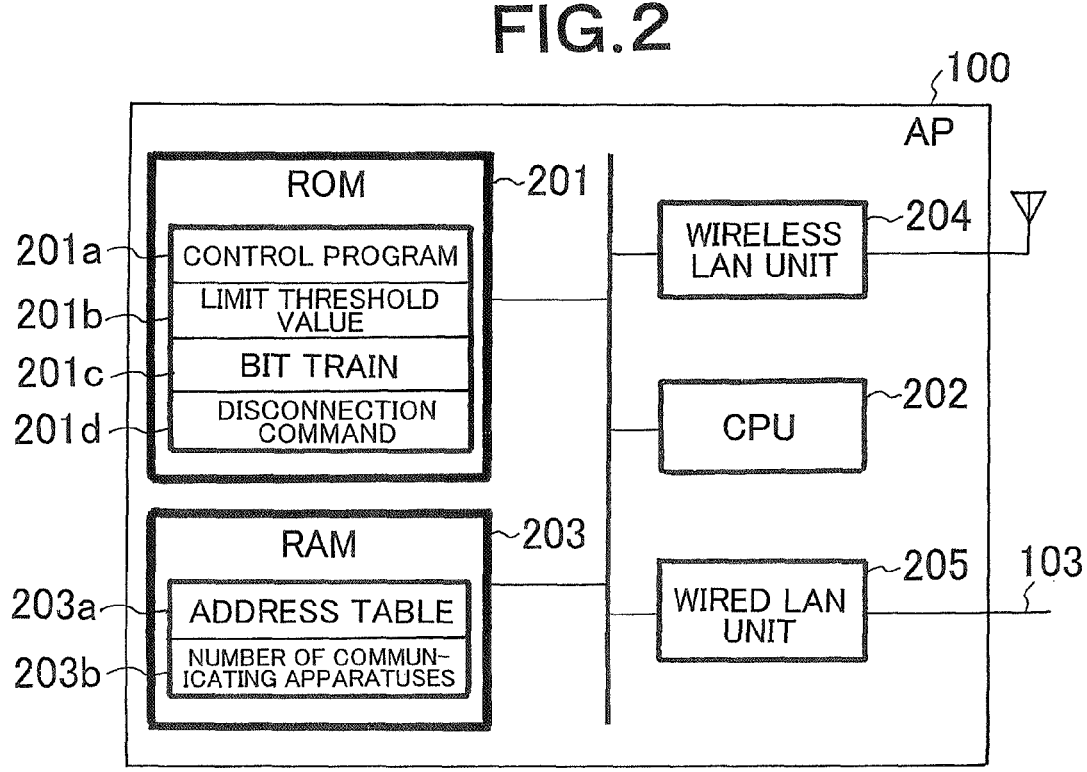

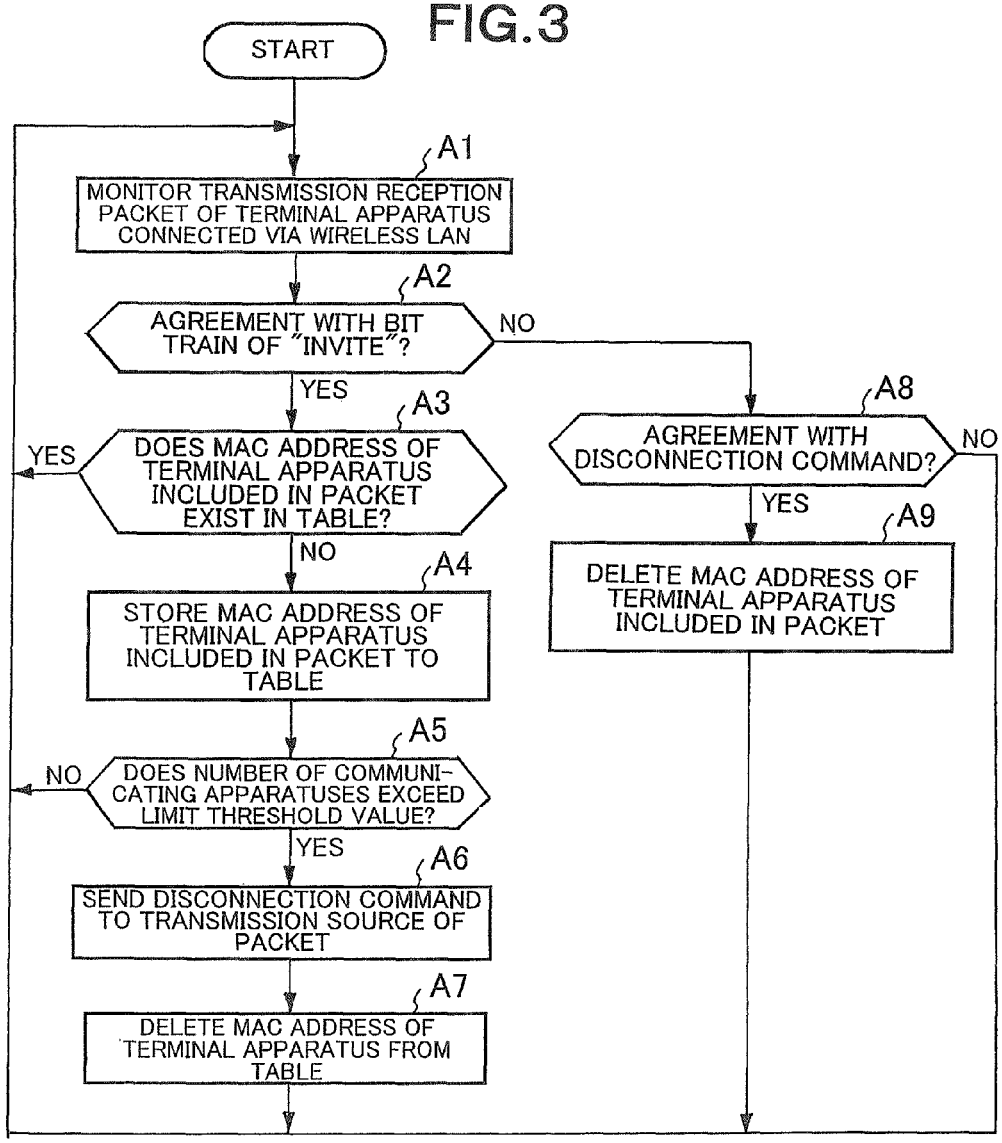

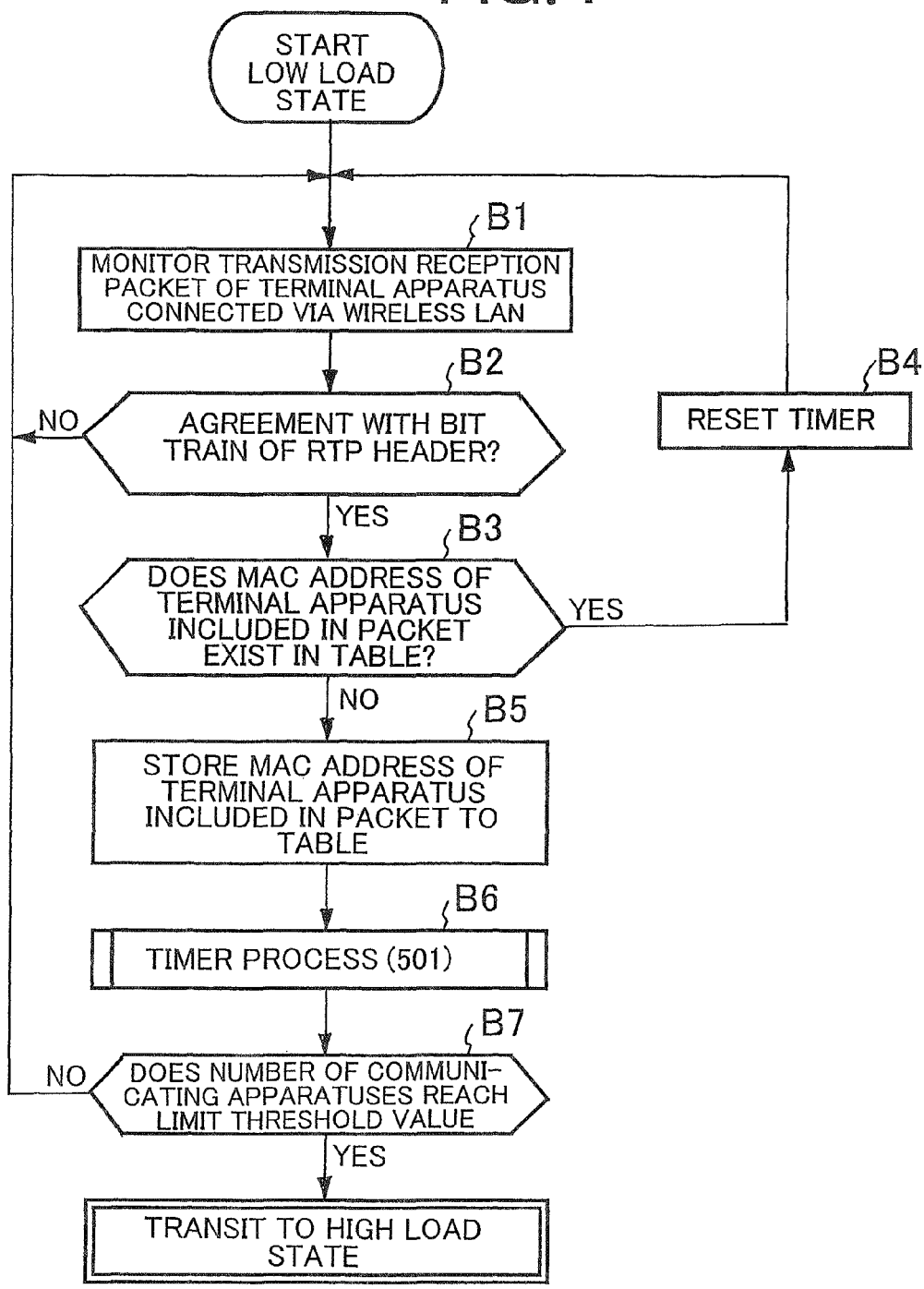

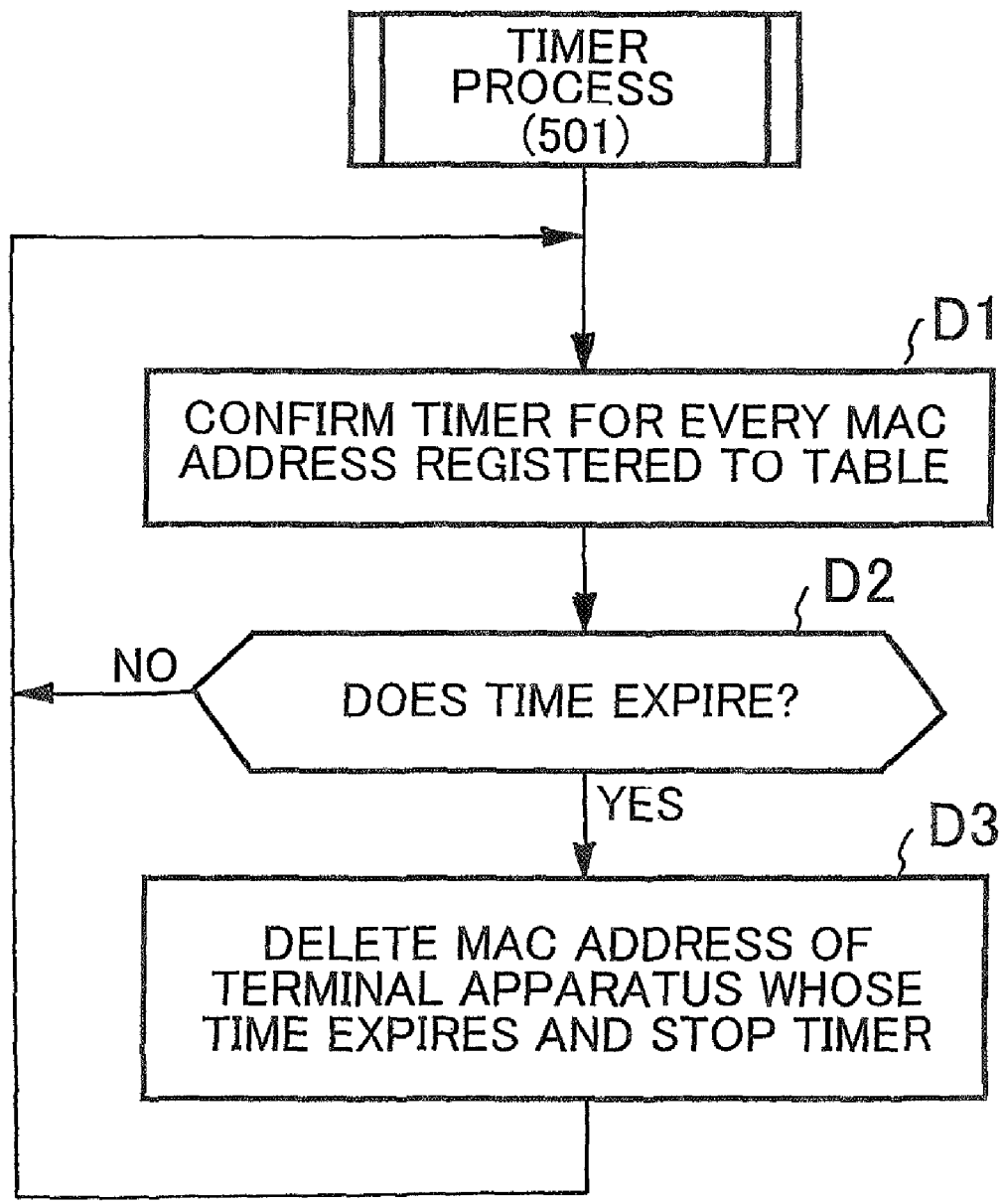

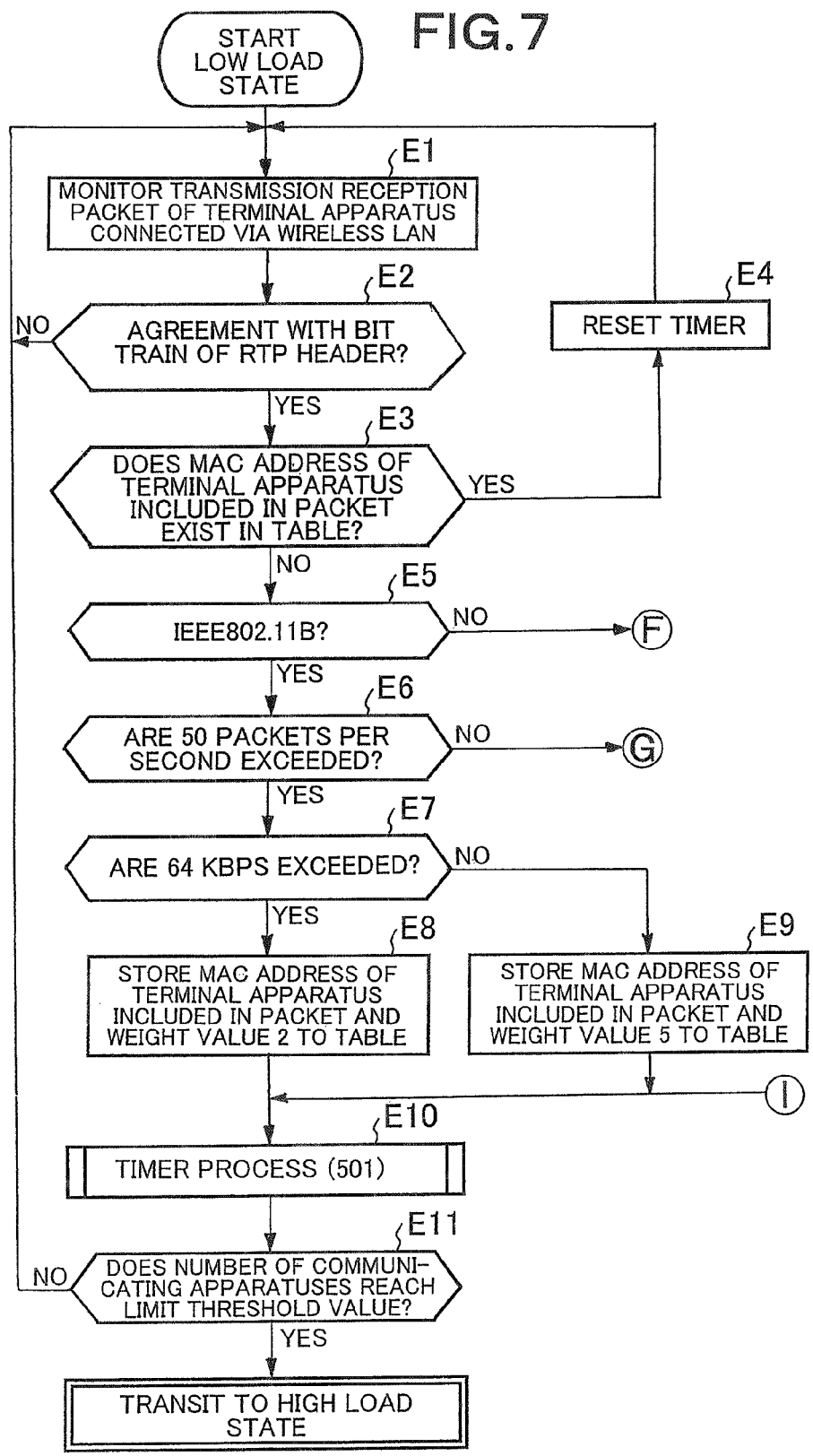

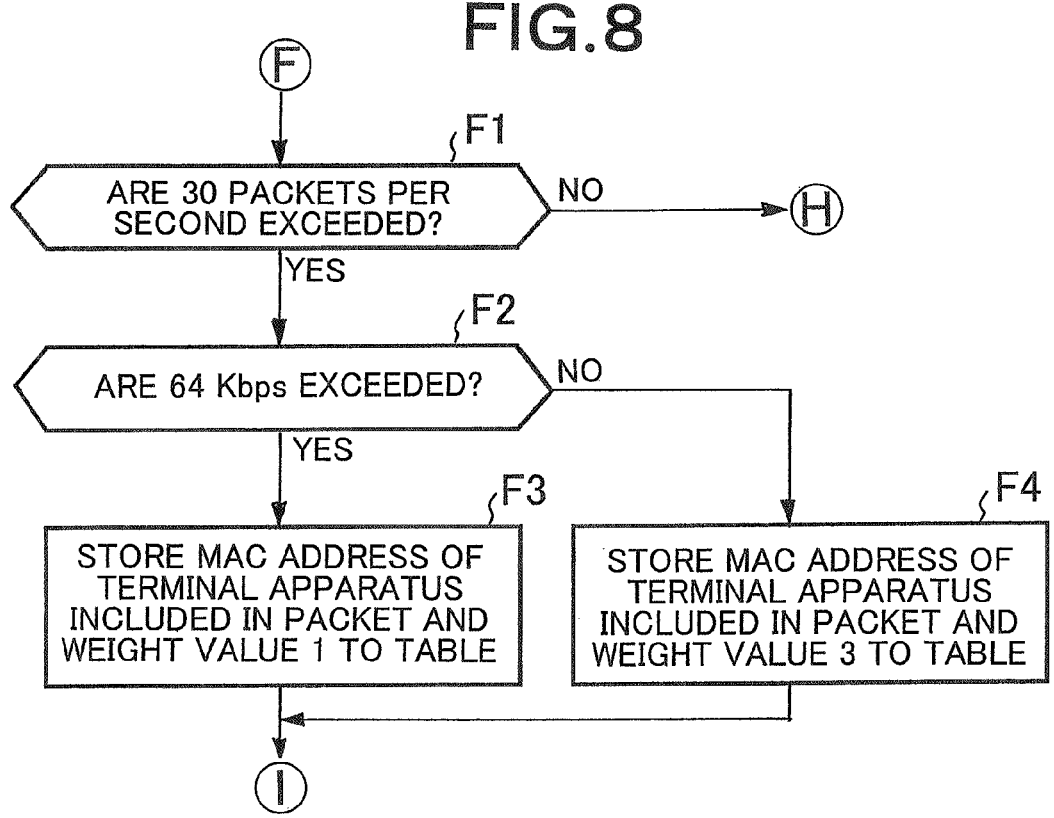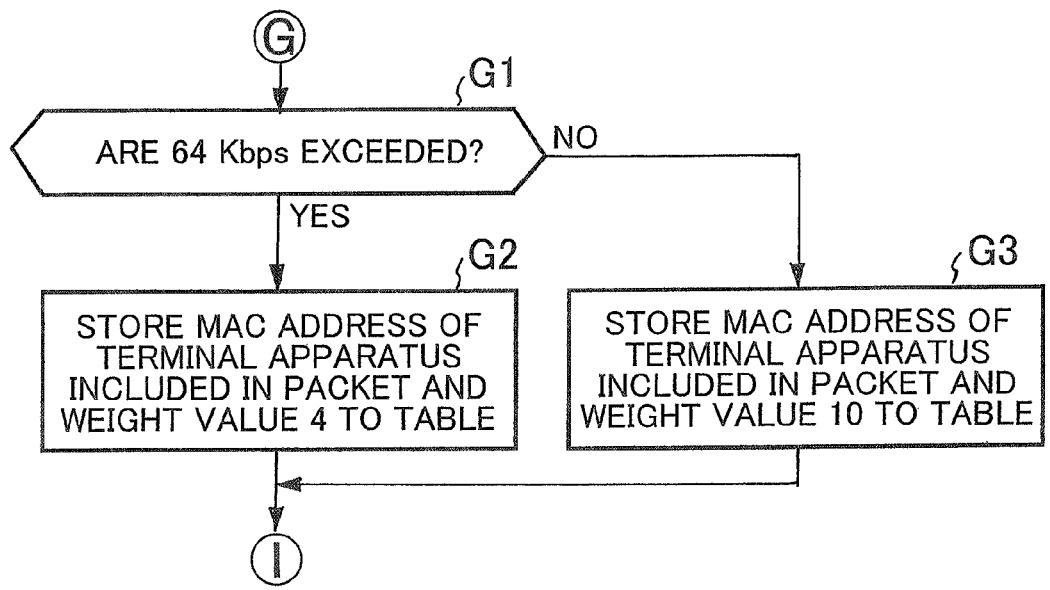

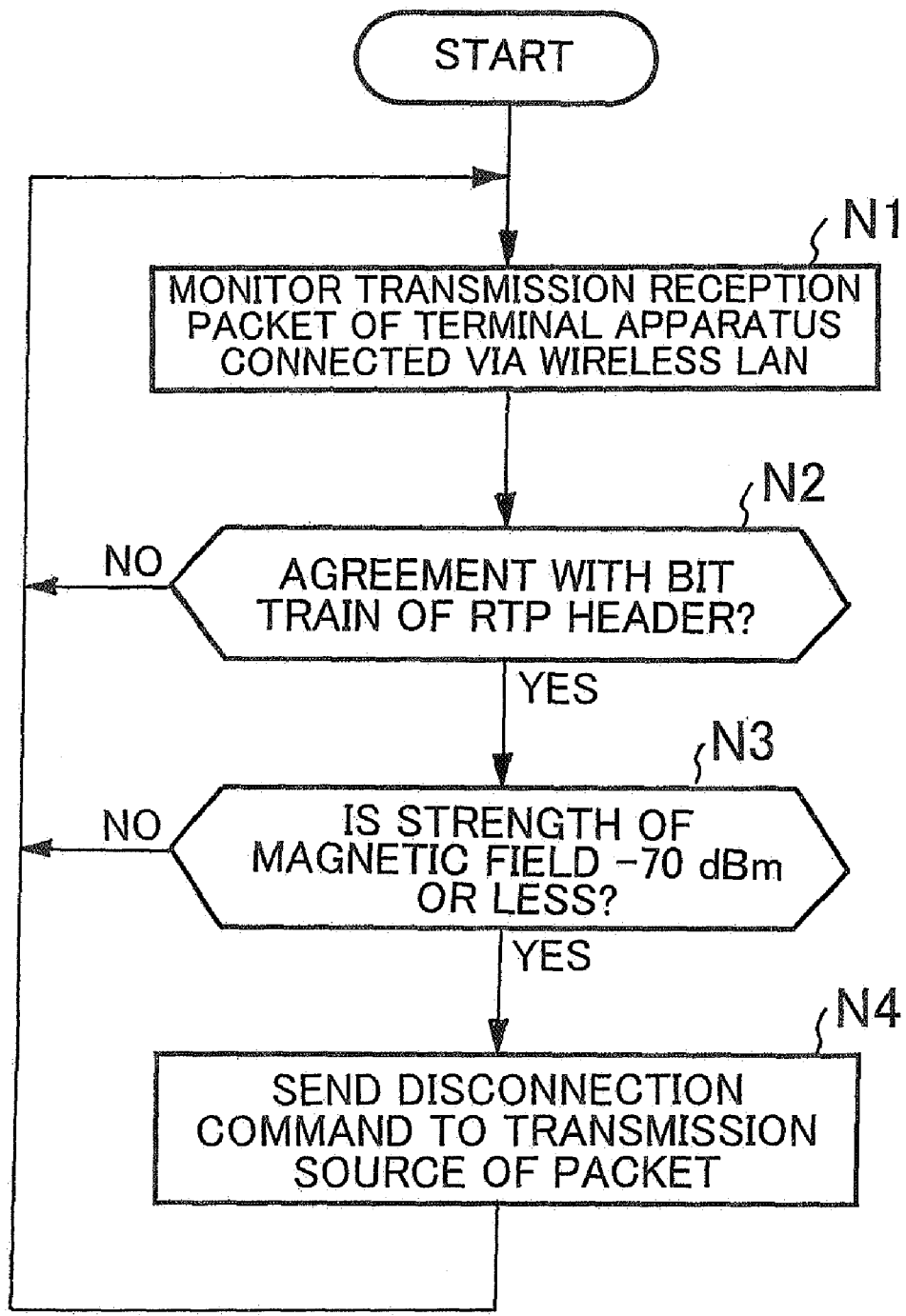

COMMUNICATION CONTROL METHOD OF WIRELESS LAN SYSTEM AND RELAY APPARATUS

BACKGROUND OF THE INVENTION

1. Field of the Invention

The present invention relates to a communication system making use of wireless LAN, and more particularly to a communication system by an access point (hereinafter, referred to as AP) in streaming communication.

2. Description of the Related Art

Heretofore, there is known streaming communication for carrying out audio communication and motion picture communication at a real time as a communication mode making use of a wireless LAN system. In general, in the streaming communication, communication can be carried out smoothly when the number of communications at an AP is relatively small. However, as the number of communications increases, since the communication band of the AP is oppressed, a packet is liable to be delayed or discarded. Thus, a disadvantage such as disconnection of communication and the like occurs on a terminal side, which makes it difficult to carry out communication comfortably.

To overcome the problem, conventional technologies propose to physically disperse a system load by installing a plurality of APs. As a kind of the technologies, there is a technology for prompting wireless connection to AP in a lower load state by that an AP in a higher load state forcibly disconnects the wireless connection of some terminal apparatuses. A technology relating to the above technology is disclosed in, for example, Japanese Patent Application Laid-Open No. 2003-124939 to be described below.

Further, there is also a technology for maintaining a load uniform in such a manner that a plurality of APs exchange load state information, and an AP having a high load reduces the strength of radio wave and an AP having a low load increases the strength of radio wave. A technology relating to the above technology is disclosed in, for example, Japanese Patent Application Laid-Open Nos. 2004-140614 and 2004-320274 described below.

Incidentally, to comfortably carry out streaming communication, the number of communications of APs must be taken into consideration. When, for example, IEEE802.11b is used as a standard of wireless LAN in a network to which VoIP (voice over Internet Protocol) is applied, the number of connections to one AP must be made to 10 or less to carry out audio communication comfortably.

Although the conventional method described above is effective to disperse the load of an AP, it pays no attention to keep the number of communications of the AP. Accordingly, even if the load is dispersed, there is a possibility that communication quality is deteriorated by that the number of communications of one set of an AP exceeds an upper limit.

SUMMARY OF THE INVENTION

An object of the present invention, which was made in view of the above problems, is to provide a method of preventing quality deterioration of streaming communication controlled by an AP.

A communication control method of the present invention comprising: recording identification information of a terminal apparatus at a relay apparatus acting as an access point of wireless LAN; wherein the identification information to be recorded is included in a packet showing a request of starting a communication among packets to be relayed by the relay apparatus; and disconnecting a communication relating to the latest identification information when the number of terminal apparatuses whose identification information is recorded exceeds a preset upper limit value.

A relay apparatus of the present invention comprising: a CPU carrying out a control program corresponding to process of a terminal apparatus acting as an access point, and a memory storing information used to carry out the control program; wherein the CPU records identification information of a terminal apparatus included in a packet showing a request of starting a communication among packets to be relayed, and disconnects a communication relating to the latest identification information when the number of the terminal apparatuses whose identification information is recorded exceeds a preset upper limit value.

According to the present invention, since the relay apparatus of wireless LAN carries out a control so as to disconnect a communication that exceeds the upper limit value as to the number of communicating apparatuses, the number of communicating apparatuses that is preferable to a streaming communication can be maintained. With this operation, deterioration of quality of the streaming communication can be prevented.

BRIEF DESCRIPTION OF THE DRAWINGS

FIG. 1 is a block diagram showing a system arrangement of an embodiment according to the present invention;

FIG. 2 is a block diagram showing an arrangement of an AP of the embodiment;

FIG. 3 is a flowchart showing an operation procedure of a first embodiment;

FIG. 4 is a flowchart showing an operation procedure of a low load state according to a second embodiment;

FIG. 6 is a flowchart showing an operation procedure of timer process according to the second embodiment;

FIG. 7 is a flowchart showing an operation procedure of a low load state according to a third embodiment;

FIG. 8 is a flowchart showing an operation procedure according to the third embodiment;

FIG. 9 is a flowchart showing an operation procedure according to the third embodiment;

FIG. 14 is a flowchart showing an operation procedure of a sixth embodiment.

DESCRIPTION OF THE PREFERRED EMBODIMENTS

Figure 5:
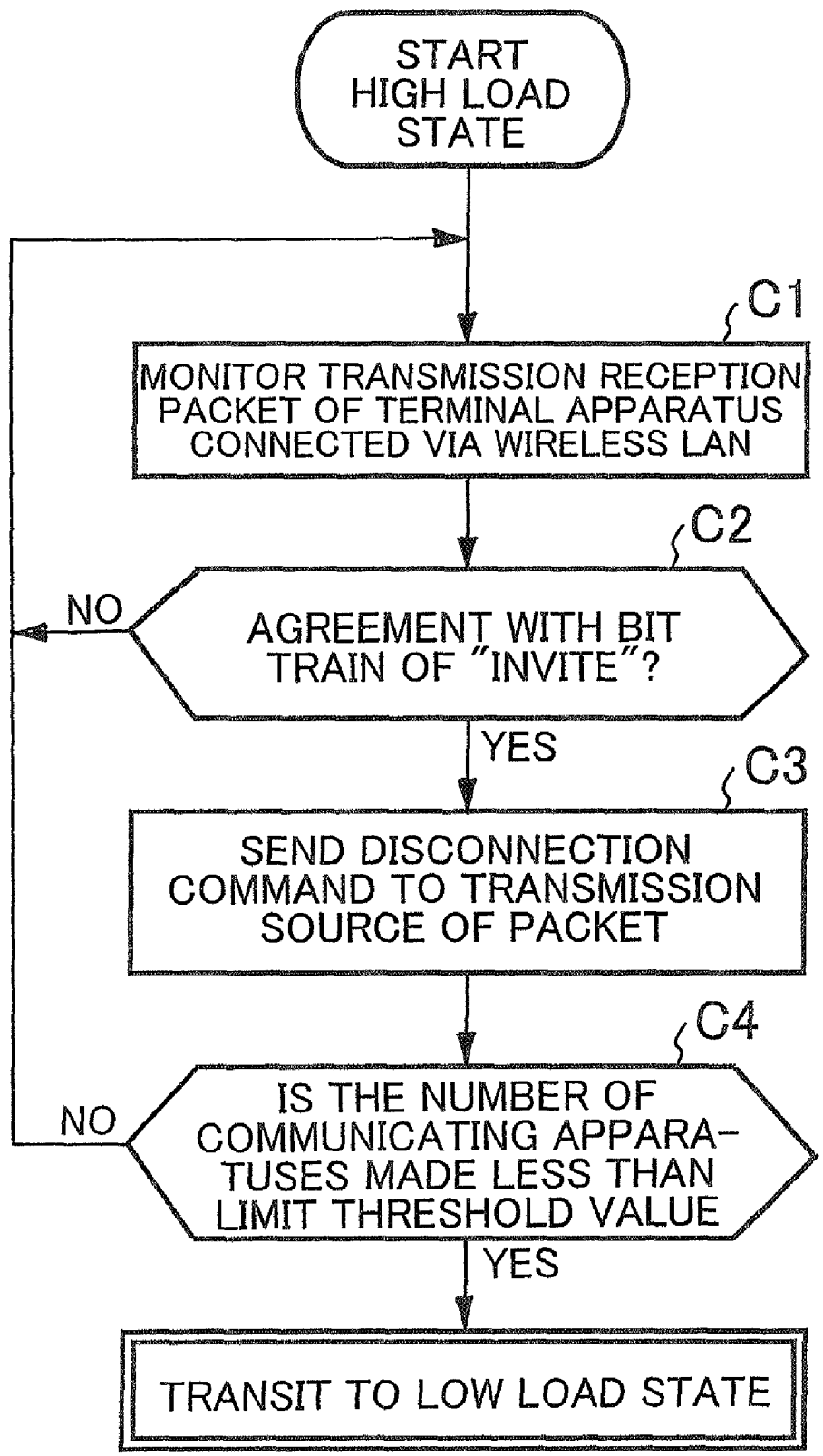
FIG. 5 is a flowchart showing an operation procedure of a high load state according to the second embodiment.

FIGS. 1 and 2 show hardware arrangements of a system 10 and an AP 100 of an embodiment according to the present invention. The arrangements shown in these figures are common to the embodiments described later. Further, although SIP (Session Initiation Protocol) is used as a protocol of a call control of VoIP communication in the respective embodiments described below, any other protocol may be used to embody the present invention, in addition to SIP.

Referring to FIG. 1, the system 10 includes the AP 100 as a relay apparatus of wireless LAN, a terminal apparatus 101 connected to the AP 100 via wireless LAN, and a terminal apparatus 102 as a communication partner of the terminal apparatus 101. The AP 100 and the terminal apparatus 102 are connected to a wired LAN 103. Further, although FIG. 1 shows only one set of the terminal apparatus 101 connected to the AP 100 via wireless LAN to simplify the figure, it is assumed that a plurality of terminal apparatus 101 actually exist.

Referring to FIG. 2, the AP 100 includes a ROM 201 for storing a control program of wireless LAN and a set value used to control, a CPU 202 for carrying out arithmetic operation based on the control program, a RAM 203 acting as a work area when the CPU 202 carries out the control program, a wireless LAN unit 204 for carrying out communication processing according to a rule based on IEEE802.11, and a wired LAN unit 205 for connection to the wired LAN 103.

The ROM 201 stores the control program 201a, a limit threshold value 201b as the set value, a reference bit train 201c showing a message of SIP and the description of a packet header, a disconnection command 201d using a code for disconnecting communication, and the like. An operation procedure of the AP 100 described later corresponds to an operation carried out by the control program 201a carried out by the CPU 202.

The limit threshold value 201b is a maximum value prescribing the number of streaming communications that can be carried out by one set of the AP 100 at the same time. The reference bit train 201c is a bit train showing an "INVITE" message showing a session start request, a packet header by RTP (Real-time Transport Protocol) used in streaming communication, and the like. Although the limit threshold value 201b, the reference bit train 201c of the message, and the disconnection command 201d may be previously stored to the ROM 201 as a program, they may be appropriately modified and added by an operator and the like.

The RAM 203 stores an address table 203a for recording the MAC address, the communication standard, and the like of the terminal apparatus 101 that carries out a streaming communication by wireless LAN connection and data of a number of communicating apparatuses 203b that can be obtained from the table at the time.

First Embodiment

Operation of a first embodiment will be explained by a flowchart shown in FIG. 3. An AP 100 monitors all the transmission packets and the reception packets relating to a terminal apparatus 101 connected via wireless LAN (step A1). During the time, the AP 100 compares the described contents a transmitted/received packet with an "INVITE" message shown by a reference bit train 201c of the ROM 201 (step A2).

As a result of comparison, when "INVITE" is described in the packet as a target to be monitored (step A2: Yes), the AP 100 confirms whether or not the same MAC address as the MAC address of the terminal apparatus 101 included in the packet is included in an address table 203a (step A3).

When the MAC address of the target exists in the address table 203a, processing of the packet is completed, and the AP 100 begins processing of a next packet (from step A3 to step A1). Further, when the MAC address of the target does not exist in the address table 203a, the AP 100 stores the MAC address to the address table 203a (step A4).

Next, the AP 100 determines whether or not the number of the MAC addresses recorded in the address table 203a at the time, that is, a number of communicating apparatuses 203b exceeds a preset limit threshold value 201b (step A5). As a result, when the determination is No, the AP 100 goes to processing of a next packet.

Further, when the number of communicating apparatuses 203b exceeds the limit threshold value 201b at the time, the AP 100 transmits a disconnection command 201d such as "600 Busy Everywhere", "486 Busy Here", or the like for disconnecting communication to a terminal apparatus 101 or 102 acting as a transmission source of a packet (step A6).

The MAC address of the transmission source added to the disconnection command 201d from the AP 100 may be the MAC address of a terminal apparatus acting as a packet destination in place of the MAC address of the AP 100. With this arrangement, the terminal apparatus of the transmission source of the packet can receive the disconnection command as that from the terminal apparatus of a communication partner.

That is, as to the packet to which the "INVITE" is described and which is processed when the number of communicating apparatuses 203b exceeds the limit threshold value 201b, when for example, the transmission source of the packet is the terminal apparatuses 102 and the destination thereof is the terminal apparatus 101, the AP 100 sets the MAC address of the terminal apparatus 101 as the transmission source of the disconnection command. With this arrangement, the terminal apparatuses 102 as the transmission source of "INVITE" recognizes the disconnection command transmitted from the AP 100 as a notification from terminal apparatus 101 as a communication partner.

As a method of disconnecting communication, the packet as the target may be discarded in place of that the AP 100 transmits the disconnection command 201d. This is because when the target packet is discarded by the AP 100, the "INVITE" message does not reach the partner, and, as a result, communication is not established.

On the completion of transmission of the disconnection command 201d, the AP 100 deletes the MAC address stored to the address table 203a at step A4 as to the terminal apparatus 101 (step A7).

In contrast, when the contents of the received packet does not correspond to the "INVITE" (step A2: No), the AP 100 determines whether or not it corresponds to the disconnection command 201d. As a result, when it corresponds to the disconnection command 201d (step A8: Yes), the AP 100 deletes the MAC address of the terminal apparatus 101 stored to the address table 203a (step A9). Further, when it does not correspond to the disconnection command 201d (step A8: No), the AP 100 carries out predetermined processing assuming that it is a packet of audio, an image, or character data being delivered, and the AP 100 goes to processing of a next packet.

As described above, the AP 100 of the first embodiment previously stores the number of streaming communications to be controlled as the limit threshold value 201b, and when the present number of communicating apparatuses 203b exceeds the limit threshold value 201b, the communications thereof are disconnected. As a result, quality deterioration of the streaming communication can be prevented.

Second Embodiment

Operation of a second embodiment will be explained. In the following embodiment, as to a load state of the AP 100, a state in which the number of communicating apparatuses 203b reaches the threshold value 201b described above is called "a high load state", and a state in which the number of communicating apparatuses 203b has a room to the threshold value 201b is called "a low load state". That is, when the AP 100 is in "the low load state", the terminal apparatus 101 can comfortably carry out the streaming communication when the AP 100 is in "the low load state". However, when the AP 100 is in "the high load state", it is difficult for the AP 100 to comfortably carry out streaming communication.

Operation of the AP 100 in "the low load state" will be explained with reference to a flowchart of FIG. 4. The AP 100 monitors a packet relating to the terminal apparatus 101 connected via wireless LAN (step B1) and determines whether or not the packet corresponds to a reference bit train 201c showing an RTP header (step B2). Although the RTP header is used here as the reference bit train 201c for showing streaming communication, the reference bit train 201c is not limited to the RTP header as long as it is information by which it can be confirmed that the packet is that of streaming communication.

When a result of the determination is No (step B2: No), the AP 100 goes to processing of next packet. Further, when the packet is the packet of streaming communication (step B2: Yes), the AP 100 confirms whether or not the MAC address of the terminal apparatus 101 included in the packet exists in the address table 203a.

As a result, when the MAC address of a target exists in the address table 203a (step B3: Yes), a timer process 501 described later is reset (step B4), and the AP 100 goes to processing of a next packet. Further, when the MAC address of a target does not exist in the address table 203a (step B3: No), the AP 100 stores the MAC address of the terminal apparatus 101 included in the packet to the address table 203a (step B5).

When the AP 100 stores the MAC address to the address table 203a, it begins the timer process 501 in relation to the MAC address (step B6). The timer process 501 is carried out for the AP 100 to periodically determine whether or not the streaming communication of the terminal apparatus 101 connected via wireless LAN is continued.

In the timer process 501, the AP 100 monitors the arriving intervals of relating packets by a timer as to the respective MAC addresses of the address table 203a, and when the timer is time out, the AP 100 determine that the streaming communication by the terminal apparatus 101 is completed. In the timer process 501, a preset value, for example, 10 seconds is stored to the ROM 201.

Further, the AP 100 monitors whether or not the present number of communicating apparatuses 203b reaches the limit threshold value 201b in parallel with the timer process 501 (step B7). As a result, when the number of communicating apparatuses 203b reaches the limit threshold value 201b, the load state of the AP 100 transits from the "the low load state" to "the high load state".

Operation of the AP 100 in "the high load state" will be explained with reference to a flowchart of FIG. 5. The AP 100 monitors the packet relating to the terminal apparatus 101 (step C1) and determines whether or not the contents of the packet corresponds to "INVITE" of the reference bit train 201c (step C2). Then, when the packet corresponds to "INVITE", "600 Busy Everywhere" or "486 Busy Here" as the disconnection command 201d is transmitted to the transmission sources of the packet (step C3). As described above, the AP 100 in "the high load state" carries out a control so as not to make new connection to the terminal apparatus 101 in "the high load state".

Even while the AP 100 is in "the high load state", it compares the present number of communicating apparatuses 203b with threshold value 201b, and while the number of communicating apparatuses 203b exceeds the threshold value 201b (step C4: Yes), the AP 100 executes the control of "the high load state". Further, when the number of communicating apparatuses 203b is made less than the threshold value 201b by the operation of the timer process 501 described below (step C4: No), the load state of the AP 100 transits from "the high load state" to "the low load state". The control of the AP 100 in "the low load state" is the same as that described above with reference to FIG. 4.

The timer process 501 will be explained with reference to a flowchart of FIG. 6. The timer process 501 is carried out periodically regardless of the load state of the AP 100. The operation cycle of the timer process 501 is set to a value of 1 second and the like and stored to the ROM 201.

The AP 100 reads out the value of a corresponding timer as to the respective MAC addresses registered to the address table 203a (step D1) and determines whether or not the timer is time out (step D2). When the timer is time out, that is, when it is determined that the streaming communication of a target terminal apparatus 101 is completed, the MAC address of the terminal apparatus 101 is deleted from the address table 203a, and the corresponding timer is stopped (step D3).

As described above, the MAC address of the terminal apparatus 101 which has completed the streaming communication is deleted from the address table 203a, and when the number of communicating apparatuses 203b is made less than the threshold value 201b thereby, the AP 100 transits from "the high load state" to "the low load state".

According to the second embodiment described above, since the timer process 501 described above for automatically recognizing the completion of the streaming communication is carried out to the MAC addresses recorded to the address table 203a, the number of connections of the AP 100, which is restricted by the limit threshold value 201b, can be effectively used.

Third Embodiment

Operation of a third embodiment will be explained. The third embodiment carries out a control in consideration of dispersion of an amount of communication per unit time and a communication speed of streaming communication.

A control of "the low load state" of the AP 100 will be explained with reference to a flowchart shown in FIG. 7. Note that since the control procedure of the AP 100 as to "the high load state" and the timer process 501 according to the third embodiment is the same as that described above with reference to FIGS. 5 and 6, the explanation of the control procedure is omitted. Further, A procedure at steps E1 to E4 shown in FIG. 7 is the same as the procedure at steps B1 to B4 shown in FIG. 4, the explanation of the procedure is also omitted.

When the AP 100 recognizes that the MAC address included in a target packet is not recorded in the address table 203a (step E3: No), the standard of wireless LAN is determined based on the communication speed of the packet. The communication speed of the packet is measured using a conventionally known method.

Although it is determined here whether or not the standard of wireless LAN is IEEE802.11b (step E5), it may be specified whether or not the standard is any of a plurality of standards. Further, packets may be simply classified by their communication speeds in place of classifying them by the standard of the wireless LAN. Note that, in the above determination, the information of the communication speeds corresponding to the respective standards of wireless LAN is previously stored to the ROM 201. This is, for example, 11 Mbps to IEEE802.11b, 54 Mbps to IEEE802.11g and IEEE802.11a other than IEEE802.11b.

When a target packet does not correspond to IEEE802.11b as a result of the determination (step E5: No), the AP 100 goes to step F described later. Further, when the target packet corresponds to IEEE802.11b (step E5: Yes), the AP 100 determines whether or not the number of packets per unit time of the terminal apparatus 101 exceeds a predetermined numerical value (step E6).

The number of packets per unit time is a value obtained by counting the number of packets transmitted and received by the AP 100 as to one set of the terminal apparatus 101, for example, every one second. Reference to the value can be realized by, for example, counting the number of packets by different processing and storing the value to the RAM 203. In the third embodiment, a set value as to the number of packets per unit time is set to "50 packets per second".

When the number of packets exceeds "50 packets per second", the AP 100 goes to step G described later. Further, when the number of packets does not exceed "50 packets per second", the AP 100 further determines whether or not the data length per unit time of the terminal apparatus 101 exceeds a predetermined data length (step E7). The data length per unit time is a value obtained by counting the packets transmitted and received by the AP 100 as to one set of the terminal apparatus 101, for example, every one second and summing the data lengths of the packets. The value is, for example, counted by different processing and stored to the RAM 203 likewise the case of the number of packets described above.

In the third embodiment, a set value as to the data length per unit time is set to "64 Kbps" and previously stored to the ROM 201. This is a setting based on that a value known as a maximum value of a data length in audio communication is set to 64 Kbps. Further, this value has an object of determining that a case in which the value is exceeded is a motion picture communication.

In the above determination, when the AP 100 determines that the data length exceeds "64 Kbps", that is, the streaming communication carried out by a target terminal apparatus 101 is a motion picture communication (step E7: Yes), the AP 100 stores the MAC address of the terminal apparatus 101 to the address table 203a after a weight value "2" is related to the MAC address (step E8).

Further, when the determination is No, that is, it is determined that the streaming communication carried out by the target terminal apparatus 101 is an audio communication (step E7: Yes), the AP 100 stores the MAC address to which a weight value "5" is related to the address table 203a (step E9). The weight value is not limited to the above ones and is appropriately set according to an object of control and prepared in the ROM 201 and the like.

When the AP 100 stores the MAC address to the address table 203a, it begins the above-mentioned timer process 501 shown in FIG. 6 (step E10). When the number of communicating apparatuses 203b at the time reaches the limit threshold value 201b (step E11: Yes), the load state of the AP 100 transits from "the low load state" to "the high load state".

At the time, although the number of communicating apparatuses 203b to be compared with the threshold value 201b is the total of the weight values of the respective MAC addresses, it is processed as described below in arithmetic operation. For example, it is assumed that the threshold value 201b is "40" as well as all the streaming communications of the terminal apparatus 101 connected at the time are motion picture communications (step E7: Yes). In this case, since the weight value in the motion picture communication is "2" (step E8), a substantial limit threshold value 201b in consideration of the weight value is "20" from "40÷2=20". Accordingly, when the number of communicating apparatuses 203b at the time is "20" or more, the AP 100 is made to "the high load state".

With reference to a flowchart of FIG. 8, operation at step F will be explained in detail. When the packet to be processed does not correspond to IEEE802.11b (FIG. 7: step E5: No), the AP 100 determines whether or not the number of packets per unit time relating to the terminal apparatus 101 exceeds "30 packets per second" (step F1). When as a result of determination is No, the AP 100 goes to step H described later.

Further, when the number of packets relating to the terminal apparatus 101 exceed "30 packets per second", the AP 100 further determines whether or not the data length per unit time exceeds "64 Kbps" (step F2). As a result of determination, when the data length per unit time exceeds "64 Kbps", that is, when the streaming communication of the target terminal apparatus 101 is the motion picture communication, the AP 100 stores the MAC address of the terminal apparatus 101 to the address table 203a after a weight value "1" is related to the MAC address (step F3). Further, when the streaming communication is the audio communication which does not exceed "64 Kbps", the AP 100 stores the MAC address to which a weight value "3" is related to the address table 203a (step F4).

When the AP 100 stores the MAC address to the address table 203a, it begins the timer process 501 (FIG. 7: step E10).

Operation at step G will be explained in detail with reference to a flowchart of FIG. 9. When the number of packets of the terminal apparatus 101 exceeds "50 packets per second" (FIG. 7: step E6: Yes), the AP 100 further determines whether or not the data length per unit time of the terminal apparatus 101 exceeds "64 Kbps" (step G1).

As a result of determination, when the communication of the target terminal apparatus 101 is the motion picture communication which exceeds "64 Kbps", the AP 100 stores the MAC address of the terminal apparatus 101 to the address table 203a after a weight value "4" is related to the MAC address (step G2). Further, when the communication is the audio communication which does not exceed "64 Kbps", the AP 100 stores the MAC address to which a weight value "10" is related to the address table 203a (step G3).

Figure 10:
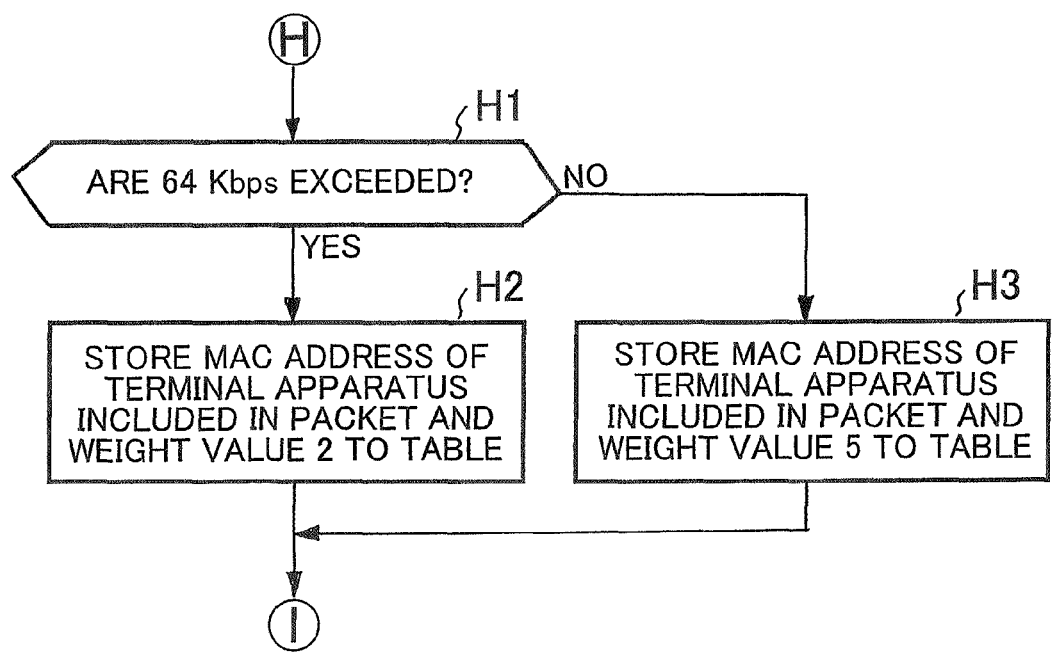
FIG. 10 is a flowchart showing an operation procedure according to the third embodiment.
Figure 11:
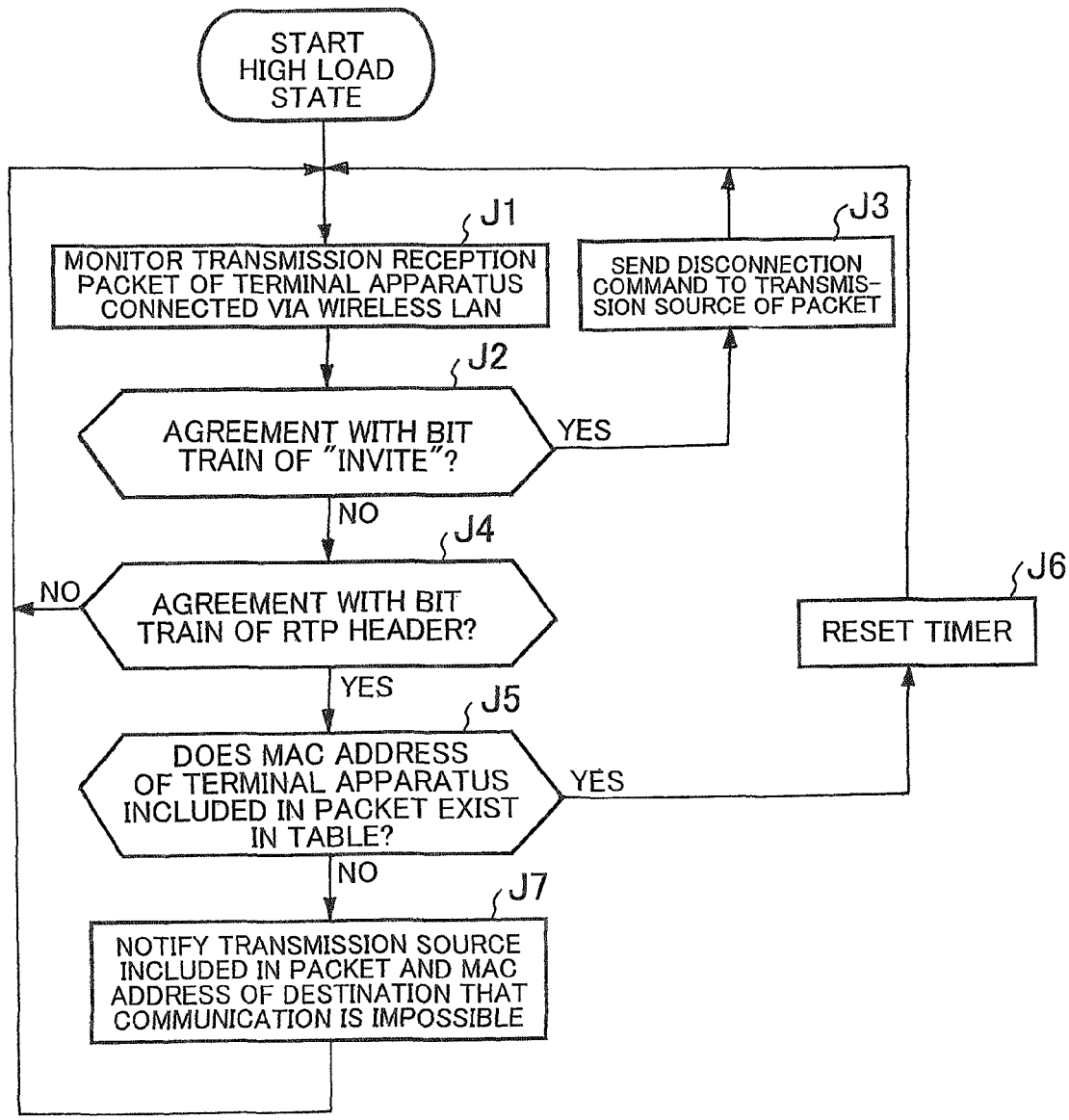
FIG. 11 is a flowchart showing an operation procedure of a high load state according to a fourth embodiment.

Operation at step H will be explained in detail with reference to a flowchart of FIG. 10. When the determination at step F1 (FIG. 8) described above is No, the AP 100 further determines whether or not the data length per unit time of the terminal apparatus 101 exceeds "64 Kbps" (step H1).

As a result of determination, when the communication of the terminal apparatus 101 is the motion picture communication which exceeds "64 Kbps", the AP 100 stores the MAC address of the terminal apparatus 101 to the address table 203a after a weight value "2" is related to the MAC address (step H2). Further, when the communication is the audio communication which does not exceed "64 Kbps", the AP 100 stores the MAC address to which a weight value "5" is related to the address table 203a (step H3).

According to the third embodiment described above, when the MAC address is recorded to the address table 203a, a weight value is set according to a communication mode of the terminal apparatus 101. As a result, even if communications having a different amount of data mixedly exist as in audio distribution and image distribution or in IEEE802.11b and IEEE802.11g, determination to the threshold value 201b can be properly carried out.

Fourth Embodiment

Operation of a fourth embodiment will be explained. The fourth embodiment is a control for coping with the terminal apparatus 101 which intends to carry out roaming during streaming communication when the AP 100 is in "the high load state" in which the number of communicating apparatuses 203*b* at the time exceeds the threshold value 201*b*.

The AP 100 in "the high load state" monitors a packet relating to the terminal apparatus 101 connected to wireless LAN (step J1) and determines whether or not an "INVITE" message is described in the packet (step J2). As a result, when the AP 100 detects the packet with "INVITE", the AP 100 transmits from "600 Busy Everywhere" or "486 Busy Here" which is the disconnection command 201*d* to the transmission source of the packet (step J3).

When a target packet is not the packet with "INVITE" (step J2: No), the AP 100 determines whether or not the header of the target packet corresponds to RTP (step J4). As a result, when a result of determination is No, the AP 100 goes to processing of a next packet. Further, when the header of the packet corresponds to RTP, AP 100 determines whether or not the MAC address of the terminal apparatus 101 included in the packet exists in the address table 203*a* (step J5).

As a result of determination, when the MAC address of the terminal apparatus 101 exists in the address table 203*a*, the AP 100 resets the timer process 501 (step J3) and goes to processing of a next packet. Further, when the result of determination is No, that is, when the packet belongs to the terminal apparatus 101 that intends to carry out roaming to the AP 100 as the packet moves during the streaming communication, the AP 100 transmits a packet of "ICMP Port Unreachable" to notify the transmission source included in the packet and to the MAC address of a destination of communication impossible (step J7).

As described above, in the fourth embodiment, the AP 100 in "the high load state" carries out the control for rejecting the communication of the terminal apparatus 101 which intends to carry out roaming. With this control, there can be protected the communications of the other terminal apparatus 101 that are already connected to the AP 100 and carry out streaming communication.

Fifth Embodiment

Operation of a fifth embodiment will be explained. In the fifth embodiment, a band use ratio or a number of packets per unit time of the AP 100 is used as an index for determining a load state of the AP 100. Since the band use ratio and the number of packets per unit time of the AP 100 can be easily obtained by an existing technology, the explanation thereof is omitted.

Note that the processing described below is carried out in combination with the second to fourth embodiments described above. That is, in the second to fourth embodiments that use the number of communicating apparatuses 203*b* as a determination standard of the load state, processing using other determination standard is carried out in parallel.

Figure 12:
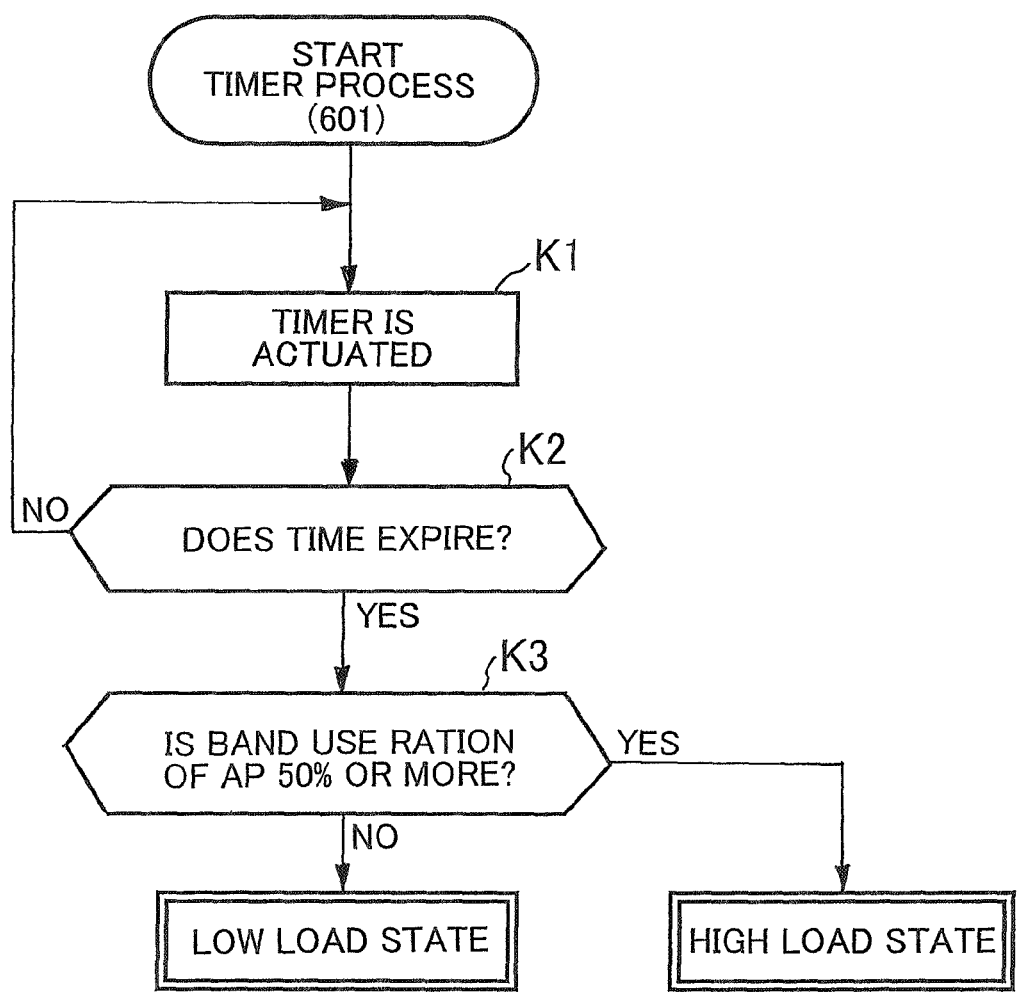
FIG. 12 is a flowchart showing an operation procedure of timer process according to a fifth embodiment.

A method of using the band use ratio of the AP 100 will be explained with reference to a flowchart of FIG. 12. The AP 100 discriminates the load state by timer process 601 shown in FIG. 12. A timer actuation time in the timer process 601 and a set value as to the band use ratio are previously set to the ROM 201.

When a timer of the timer process 601 is actuated (step K1) and time out (step K2: Yes), the AP 100 determines whether or not the band use ratio exceeds the set value at the time. It is assumed here that "50%" is set as the set value of the band use ratio.

As a result of determination, when the band use ratio of the AP 100 at the time is less than "50%", it is assumed that the load state is "the low load state" (step K3: No), whereas when the band use ratio is "50%" or more, it is assume that the load state is "the high load state" (step K3: Yes).

Figure 13:
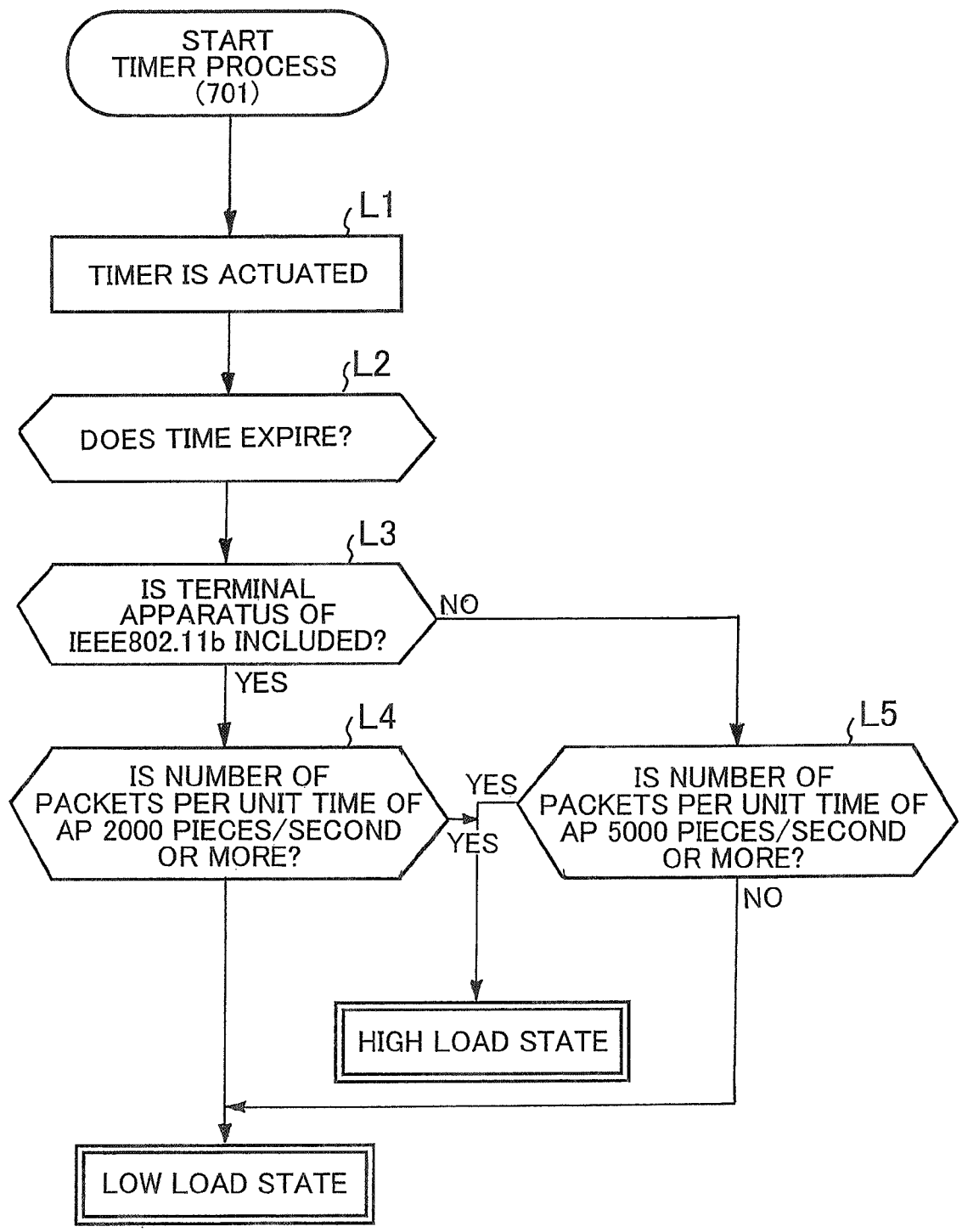
FIG. 13 is a flowchart showing an operation procedure of the timer process according to the fifth embodiment.

Next, a method of using the number of packets per unit time of the AP 100 will be explained in detail with reference to a flowchart of FIG. 13. The AP 100 discriminates the load state by a timer process 701 shown in FIG. 13. A timer actuation time in the timer process 701 and a set value as to the number of packets are previously set to the ROM 201.

The AP 100 actuates a timer of the timer process 601 (step L1), and when the timer is time out (step L2: Yes), the AP 100 determines whether or not a terminal corresponding to IEEE802.11b is included in the terminal apparatus 101 connected to wireless LAN (step L3). In the determination, the AP 100 refers to the information of the communication standard recorded in the address table 203*a*.

A reason why determination as to the communication standard is carried out resides in that, in general, the communication speed of IEEE802.11b is different from those of IEEE802.11g and the like. Accordingly, a different determination standard is employed as to the number of packets per unit time in a case in which IEEE802.11b is included in a present communication and in a case in which IEEE802.11b is not included therein.

When the terminal corresponding to IEEE802.11b is included in the currently connected terminal apparatus 101, the AP 100 determines whether or not a present number of packets per unit time is "2000 pieces per second" or more. As a result of determination, when the present number of packets per unit time is less than "2000 pieces per second" (step L4: No), the AP 100 determines that the load state is "the low load state", whereas when the present number of packets per unit time is "2000 pieces per second" or more (step L4: Yes), the AP 100 determines that the load state is "the high load state".

In contrast, when the terminal corresponding to IEEE802.11b is not included in the currently connected terminal apparatus 101 (step L3: No), the AP 100 determines whether or not the present number of packets per unit time is "5000 pieces per second" or more. When a result is No (step L5: No), the AP 100 determines that the load state is "the low load state", whereas when the present number of packets per unit time is "5000 pieces per second" or more (step L5: Yes), the AP 100 determines that the load state is "the high load state".

The AP 100 can multilaterally determine whether or not the load state is "the high load state" in which a new communication must be disconnected by carrying out the processing of the fifth embodiment described above in parallel with the processings of the embodiments described above.

Sixth Embodiment

Operation of a sixth embodiment will be explained. The sixth embodiment controls communication based on a strength of magnetic field of the terminal device 101 connected to the AP 100. The control may be carried out by being combined with the respective embodiments described above.

Operation of the sixth embodiment will be explained with reference to a flowchart shown in FIG. 14. The AP 100 monitors the packet of the terminal apparatus 101 connected to wireless LAN (step N1) and determines whether or not "INVITE" is described to the packet (step N2).

As a result, when the AP 100 detects "INVITE" from the packet, it confirms the strength of the magnetic field of the terminal apparatus 101. The magnetic field is confirmed making use of a conventionally known technology. As a result, when the strength of magnetic field of the terminal apparatus 101 is "−70 dBm" or less previously set to the ROM 201 (step N3: Yes), "600 Busy Everywhere" or "486 Busy Here" that is the disconnection command is transmitted to the transfer source of the packet (step N4).

As described above, when the magnetic field of the terminal apparatus 101 to be connected to wireless LAN is greatly small, the AP 100 of the six embodiment carries out a control so as not to connect the terminal apparatus 101 determining that it is difficult for the terminal apparatus 101 to carry out streaming communication. With this operation, reduction of performance of the AP 100 can be prevented.

Although the exemplary embodiments of the present invention have been described in detail, it should be understood that various changes, substitutions and alternatives can be made therein without departing from the spirit and scope of the invention as defined by the appended claims. Further, it is the inventor's intent to retrain all equivalents of the claimed invention even if the claims are amended during prosecution.

What is claimed is:

1. A communication control method comprising:
   recording identification information of a first terminal apparatus at a relay apparatus acting as an access point of wireless LAN, wherein the identification information to be recorded is included in a request packet for establishing a streaming communication between the first terminal apparatus and a second terminal apparatus among packets to be relayed by the relay apparatus;
   determining whether a number of terminal apparatuses whose identification information is recorded at the relay apparatus exceeds a preset upper value;
   disconnecting a connection between the relay apparatus and the first terminal apparatus if it is determined that the number of terminal apparatuses whose identification information is recorded at the relay apparatus exceeds the preset upper limit value;
   beginning a timer process at the relay apparatus for measuring a predetermined period of time when recording the identification information of the first terminal apparatus;
   determining whether the identification information of the first terminal apparatus is previously recorded at the relay apparatus;
   resetting the predetermined period of time if it is determined that the identification information of the first terminal apparatus is previously recorded at the relay apparatus; and
   deleting the identification information of the first terminal apparatus from identification information recorded at the relay apparatus if the predetermined period of time expires,
   wherein when the relay apparatus records the identification information of the first terminal apparatus, the relay apparatus relates a preset weight value to the identification information to be recorded according to the number of packets per unit time and the data length of a streaming communication carried out by the first terminal apparatus, and
   wherein the relay apparatus periodically determines whether a number of packets per unit time of a streaming communication carried out at the time exceeds a preset upper limit value, and when the number of packets per unit time exceeds the upper limit value, the relay apparatus disconnects a connection between the relay apparatus and a terminal apparatus.

2. The communication control method of claim 1, wherein if it is determined that the number of the terminal apparatuses whose identification information is recorded exceeds the preset upper limit value, the relay apparatus rejects new connection by roaming.

3. The communication control method of claim 1, wherein the relay apparatus periodically determines whether or not a band use ratio thereof exceeds a preset upper limit value, and when the band use ratio exceeds the upper limit value, the relay apparatus disconnects a connection between the relay apparatus and a terminal apparatus.

4. The communication control method of to claim 1, wherein the relay apparatus periodically determines whether a strength of magnetic field of a terminal apparatus acting as the transmission source of the request packet is less than a preset value, and when the strength of the magnetic field is less than the preset value, the relay apparatus disconnects a connection between the relay apparatus and a terminal apparatus.

5. The communication control method of claim 1, wherein when the relay apparatus disconnects the connection between the relay apparatus and the first terminal apparatus, the relay apparatus transmits a packet showing disconnection of the connection to the transmission source of the request packet.

6. The communication control method of claim 1, wherein when the relay apparatus disconnects the connection between the relay apparatus and the first terminal apparatus, the relay apparatus discards a packet relating to the first terminal apparatus.

7. A relay apparatus comprising:
   a CPU carrying out a control program corresponding to process of a terminal apparatus acting as an access point; and
   a memory storing information used to carry out the control program,
   wherein the CPU records identification information of a first terminal apparatus included in a request packet for establishing a streaming communication between the first terminal apparatus and a second terminal apparatus among packets to be relayed by the relay apparatus, determines whether a number of terminal apparatuses whose identification information is recorded at the relay apparatus exceeds a preset upper value, disconnects a connection between the relay apparatus and the first terminal apparatus if it is determined that the number of the terminal apparatuses whose identification information is recorded at the relay apparatus exceeds a preset upper limit value, beings a timer process at the relay apparatus for measuring a predetermined period of time when recording the identification information of the first terminal apparatus, determines whether the identification information of the first terminal apparatus is previously recorded at the relay apparatus, resets the predetermined period of time if it is determined that the identification information of the first terminal apparatus is previously recorded at the relay apparatus, and deletes the identification information of the first terminal apparatus from identification information recorded at the relay apparatus if the predetermined period of time expires,
   wherein when the CPU records the identification information of the first terminal apparatus to the memory, the CPU relates a preset weight value to the identification information to be recorded according to the number of packets per unit time and the data length of a streaming communication carried out by the first terminal apparatus, and
   wherein the CPU periodically determines whether a number of packets per unit time of a streaming communication carried out at the time exceeds a preset upper limit value, and when the number of packets per unit time exceeds the upper limit value, the CPU disconnects a connection between the relay apparatus and a terminal apparatus.

8. The relay apparatus of claim 7, wherein if it is determined that the number of the terminal apparatuses whose identification information is recorded exceeds the preset upper limit value, the CPU rejects new connection by roaming.

9. The relay apparatus of claim 7, wherein the CPU periodically determines whether a band use ratio thereof exceeds a preset upper limit value, and when the band use ratio exceeds the upper limit value, the CPU disconnects a connection between the relay apparatus and a terminal apparatus.

10. The relay apparatus of claim 7, wherein the CPU periodically determines whether the strength of a magnetic field of a terminal apparatus acting as a transmission source of the request packet is less than a preset value, and when the strength of the magnetic field is less than the preset value, the CPU disconnects a connection between the relay apparatus and a terminal apparatus.

11. The relay apparatus of claim 7, wherein when the CPU disconnects the connection between the relay apparatus and the first terminal apparatus, the CPU transmits a packet showing disconnection of the connection to the transmission source of the request packet.

12. The relay apparatus of claim 7, wherein when the CPU disconnects the connection between the relay apparatus and the first terminal apparatus, the CPU discards a packet relating to the first terminal apparatus.

* * * * *